Sept. 20, 1966 L. J. CORBIN 3,274,386
APPARATUS FOR PRODUCING WIDE ANGLE X-RAY PHOTOGRAPHS
Filed May 14, 1962 3 Sheets-Sheet 1
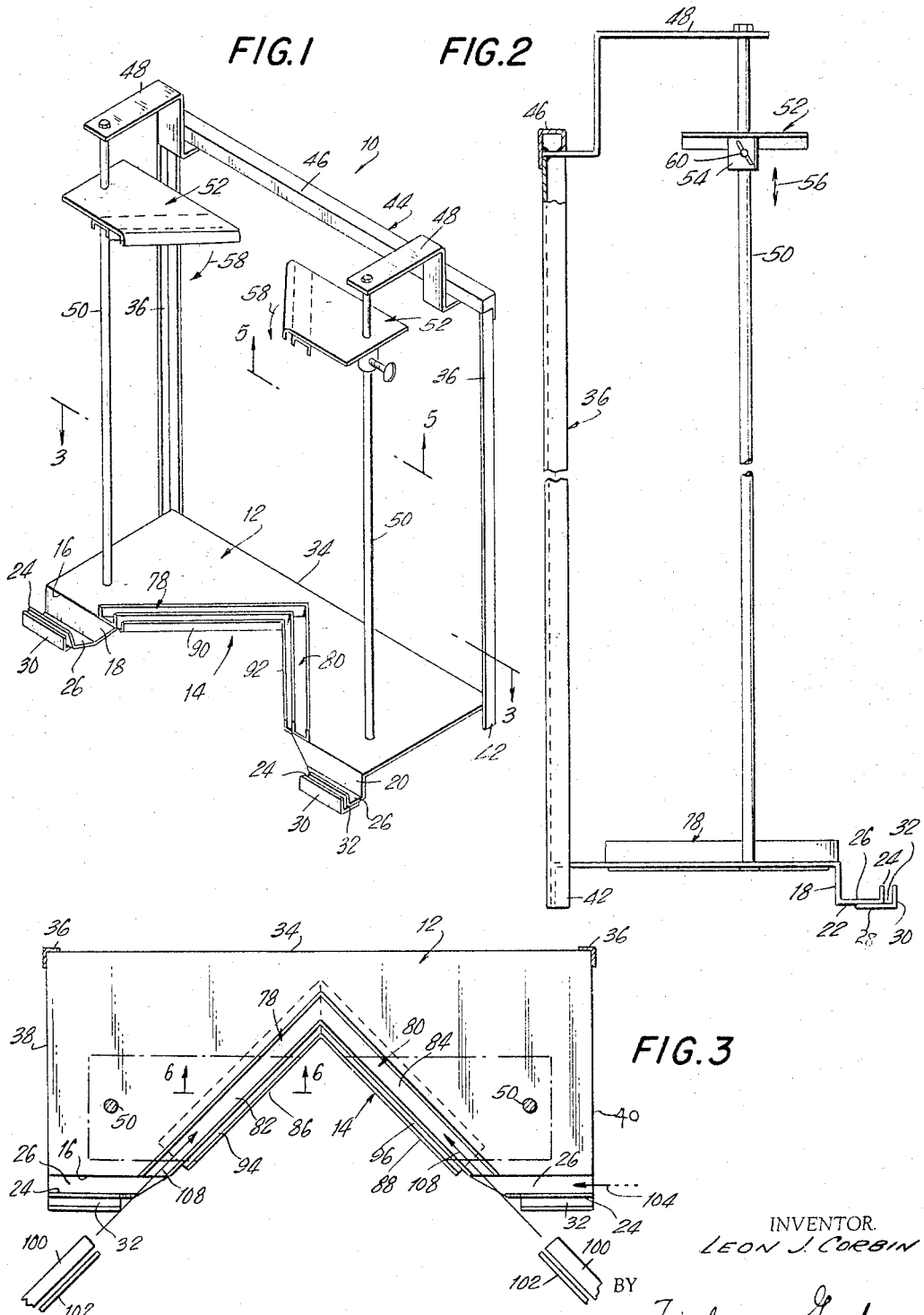
INVENTOR.
LEON J. CORBIN
BY
Friedman & Goodman
ATTORNEYS Sept. 20, 1966    L. J. CORBIN    3,274,386
APPARATUS FOR PRODUCING WIDE ANGLE X-RAY PHOTOGRAPHS
Filed May 14, 1962    3 Sheets-Sheet 2
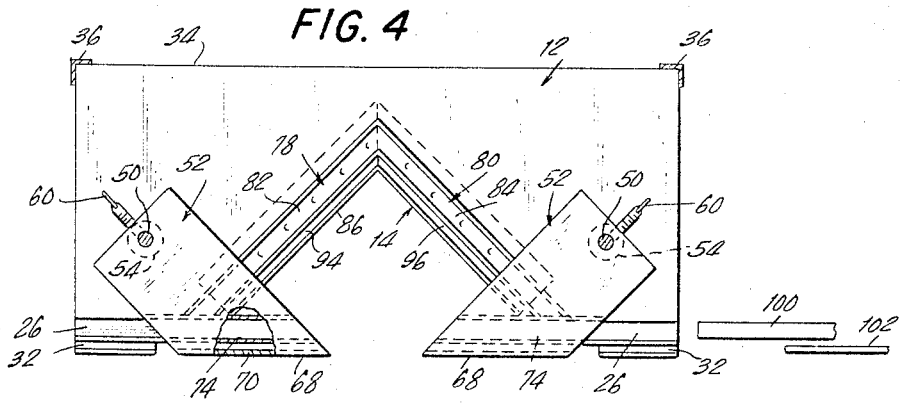
INVENTOR.
LEON J. CORBIN
BY
Friedman + Goodman
ATTORNEYS Sept. 20, 1966  L. J. CORBIN  3,274,386
APPARATUS FOR PRODUCING WIDE ANGLE X-RAY PHOTOGRAPHS
Filed May 14, 1962  3 Sheets-Sheet 3

INVENTOR.
LEON J. CORBIN
BY
Friedman & Goodman
ATTORNEYS

United States Patent Office 3,274,386
Patented Sept. 20, 1966

3,274,386
APPARATUS FOR PRODUCING WIDE ANGLE
X-RAY PHOTOGRAPHS
Leon J. Corbin, 1369 Rosedale Ave., Bronx, N.Y.
Filed May 14, 1962, Ser. No. 194,492
3 Claims. (Cl. 250—66)

The present invention relates generally to radiography and in particular to wide-angle radiography.

The present practice of the techniques of radiography or the taking of X-ray photographs involves the utilization of a single X-ray plate to take an X-ray photograph of a portion of the body. Using single X-ray plates, conventional roentgenograms of anatomic structures are ordinarily obscured by foreshortening and super-imposition. As a result, the diagnostic range of prior art X-ray photographs is limited since the images of the anatomic structures which are ordinarily obscured by foreshortening and super-imposition greatly interfere with the reading or interpretation of the X-ray by the physician.

In view of the foregoing, it is an object of the present invention to provide a roentgenogram for X-ray photographs or diagnostic study which greatly enhances their value over prior art X-ray photographs.

It is another object of the present invention to essentially separate images of anatomic structure which are ordinarily obscured by foreshortening and super-imposition as on prior art X-ray photographs.

It is another object of the present invention to provide a method and apparatus for wide-angle radiography which produces with a single exposure a pair of diagnostic roentgenograms which enhance the visibility of areas otherwise obscure on the X-ray photographs.

It is a further object of the present invention to provide means for illustrating abnormalities which are not appreciated on routine frontal and oblique projections on X-ray plates, which abnormalities sometimes are not seen even in retrospect.

The foregoing and other and further objects and advantages of the present invention will become readily apparent to those skilled in the art from a consideration of the following specification taken in connection with the claims and drawings.

In the drawings which illustrate the best mode presently contemplated,

FIGURE 1 is a perspective view of a cassette holder for X-ray plates pursuant to the present invention.

FIGURE 2 is an end view on an enlarged scale with parts being shown in section and broken away for purposes of illustration.

FIGURE 3 is a sectional view taken on the line 3—3 of FIGURE 1, showing a pair of cassettes about to be inserted for wide-angle radiography.

FIGURE 4 is a top plan view of the holder with parts thereof arranged for conventional X-ray photographs and with portions broken away for purposes of illustration.

FIGURE 5 is a fragmentary sectional view taken on line 5—5 of FIGURE 1.

FIGURE 6 is a fragmentary sectional view on an enlarged scale taken on the line 6—6 of FIGURE 3 and shows the cassetes in position for wide-angle radiography.

FIGURE 7 is a front elevation view of the holder.

Figure 10:
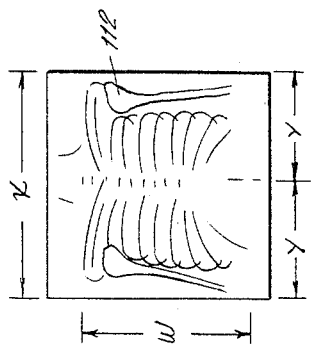
FIGURE 10 illustrates a prior art or plane X-ray photograph of the rib cage and shoulders of a patient.

Referring now to the drawings in detail, the reference numeral 10 indicates a holder for X-ray cassettes or plates pursuant to the present invention. As here shown, the holder 10 is provided with a base or table 12 having a V-shaped recess 14 defined therein centrally of one side edge 16 thereof. At said side edge 16, the base 12 is provided with laterally spaced depending portions 18 and 20 which straddle the V-shaped recess 14 and which are provided with laterally extending flanges 22 terminating in upwardly extending rims or lips 24. It will be understood that the depending portions define with the associated flanges 22 and rims 24 a track or recess 26, it being noted that the tracks 26 are in horizontal alignment or registry at the side or front edge 16 of the base 12, as best seen in FIGURES 1 and 3 and 4. An L-shaped member 28 is secured to the undersurface of each flange 22, as best shown in FIGURE 2. Said L-shaped members are each provided with an upstanding rim or lip 30 which is disposed in laterally-spaced relation to the rim or lip 24. It will be noted that the spaced-parallel rims 24 and 30 and the portion of member 28 extending therebetween define a second track or recess 32 which is disposed laterally outwardly and parallel to the associated track or recess 26, it being further noted that track 32 is narrower than track 26. Consequently, it will be apparent that the base 12 is provided at the front side edge 16 thereof with a pair of horizontally disposed and aligned tracks 26 and with a second pair of horizontally disposed and aligned narrower tracks 32. It will also be noted that the portions which define the pairs of tracks 26 and the pairs of tracks 32 constitute additionally and function as a pair of depending legs for the base 12 along the front side edge 16 thereof.

At the opposing or rear side edge 34 thereof the base 12 is provided with a pair of vertical or upstanding angle members 36 secured at the corners defined by the side edge 34 and the opposing ends 38 and 40 of the base 12. As best seen in FIGURES 1 and 2, the vertical angle members 36 have portions 42 thereof which extend below the base 12 to constitute a pair of rear legs which together with the previously described front legs serve to support the base 12 in position spaced above an underlying supporting surface.

The angle members 36 constitute portions of a framework generally indicated by the reference numeral 44 which is provided on the base 12. More specifically, in addition to the angle members 36 the framework 44 includes as here shown, a hollow rectangular strut 46 which extends between the upper ends of the angle members 36 being suitably secured thereto as by welding or other conventional means. Adjacent each of vertical angle member 36, the strut 46 is provided with a forwardly extending arm 48 which projects from the rear edge 34 of the base toward the front edge 16 thereof. Each arm 48 secures in position the upper end of a rod 50, the lower end of which is suitably secured to the base 12.

Each rod 50 mounts a bracket or clamp 52. More specifically, each bracket 52 is provided with a collar 54 which has a loose fit on the associated rod 50 so that the bracket 52 may be adjusted vertically of the associated rod 50 as indicated by the arrows 56. In addition, the bracket 52 may be rotated about the associated rod 50 as shown by the arrow 58. Each collar 54 is provided with a thumb screw 60 by means of which it may be secured in an adjusted position on the associated rod 50. As best shown in FIGURE 5, each bracket 52 is provided with a pair of parallel side edges 62 and 64, with one end edge or surface 66 which extends transversely of the parallel side edges 62 and 64 and with an imposing end edge or surface 68 which is obliquely disposed relative to the opposing end edge 66 substantially at a 45° angle relative thereto. At the oblique edge 68 there is provided a depending rim or lip 70. At the undersurface thereof, each bracket 52 is provided with a U-shaped member 72 which extends between the opposing side edges 62 and 64 in parallel relation to the rim 68. The U-shaped member 72 defines a track 74 on the lower surface of the bracket 52 and is provided with a lip or rim 76 which defines with the rim 68 and the intervening portion of the bracket 52 a track 78 on the lower surface of the bracket 52 which is parallel to the track 74. It will be noted that the track 74 is wider than the track 78 and is parallel therewith and that both tracks extend at an angle of substantially 45° relative to the end edge 66 of the bracket.

In addition to the horizontally paired tracks 26 and 32, the base 12 is provided also with obliquely related pairs of tracks at the V-shaped recess 14 thereof. More specifically, and as best shown in FIGURES 1, 3, 4, 6 and 7, the base 12 is provided at its upper surface at the recess 14 with a pair of U-shaped members which are disposed thereon in right-angular relationship to provide the pair of tracks 84 and 86 which are in oblique relationship to each other being disposed in substantially 90° angular relationship. A pair of L-shaped members 86 and 88 are secured to the undersurface of the base 12 at the V-shaped recess 14 thereof being disposed in substantially 90° angular relationship. Said L-shaped members extend laterally outwardly of the associated or adjacent U-shaped members 78 and 80, in parallel relation therewith, and are provided with the outstanding lips 90 and 92 which define with the adjacent U-shaped member and the intervening portion of the associated L-shaped member the tracks 94 and 96 which extend parallel to the adjacent tracks 82 and 84 respectively laterally outwardly of the latter.

From the foregoing it will be apparent that the base 12 is provided at the front edge 16 thereof with a pair of horizontally aligned inner tracks 26, each having an associated outer track 32, the outer tracks 32 being also in horizontal alignment and being narrower than the inner tracks 26. Between the horizontally spaced pairs of tracks 26 and 32, the base is also provided with a pair of obliquely related tracks 82 and 84 each having an associated laterally disposed track, said laterally disposed tracks being indicated by the reference numerals 94 and 96. The outer tracks 94 and 96 are also obliquely related and are narrower than the associated tracks 82 and 84. In addition, each bracket 52 is provided at its lower surface with the previously identified inner obliquely extending track 74 and with an associated parallel track 98 defined by the opposing rims or lips 68 and 76 and the intervening portion of the bracket 52. Consequently, it will be apparent that on each bracket 52, there is a pair of tracks 74 and 98 which are in parallel relation extending obliquely of the end edge 66, the track 98 being narrower than the track 74. In each case the wider track is adapted to receive an X-ray cassette 100 and the narrower track is adapted to receive a conventional shield 102 to absorb secondary radiation.

The holder 10 of the present invention may be used either for conventional radiography or for wide-angle radiography. When used for conventional radiography a single conventional X-ray cassette 100 is inserted, at the lower edge thereof, into the horizontally aligned tracks 26 as indicated by the arrow 104 in FIGURE 3. The shield 102 is inserted in the same manner into the horizontally aligned narrower tracks 32. In order to retain the cassette and the shield in said position parallel to the longitudinal axis of the base 12, the thumb screws 60 of collars 54 are retracted or loosened so that the clamps 52 may be rotated to the positions thereof illustrated in FIGURE 4 wherein the tracks 74 are in vertical alignment with the underlying tracks 26 respectively and the narrower tracks 98 are in vertical alignment with the narrower tracks 32 respectively. The clamps are vertically adjusted on the rods 50 so as to overlie the upper marginal edges of the cassette 100 and the shield 102 and then moved downwardly as indicated by arrow 56 so that the cassette and the shield are engaged in the upper track 74 and 98 as best shown in FIGURE 6. The thumb screws are then tightened so that the cassette and the shield are retained in position parallel to the longitudinal axis of the base 12. This is indicated in the broken lined position of the cassette 100 in FIGURE 9 wherein an X-ray is being taken of the patient Q, the X-ray tube being indicated at 106. This will produce a conventional X-ray of the type illustrated in FIGURE 10. The cassette and shield may also be simply slid into or put in position from the side.

Figure 9:
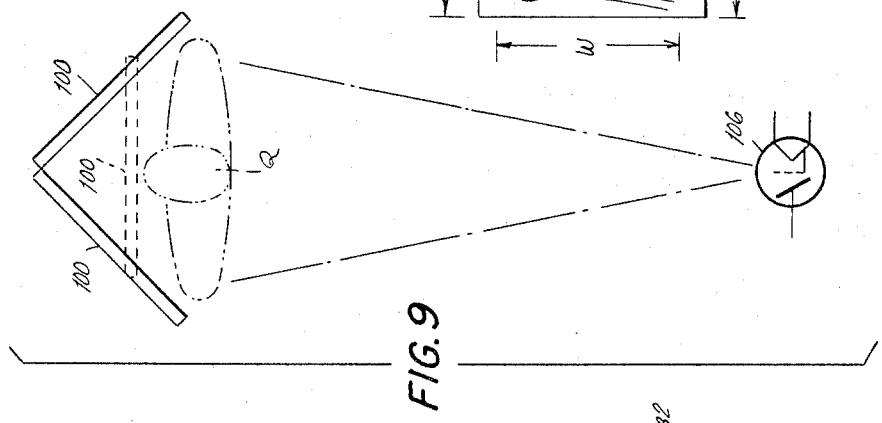
FIGURE 9 is a more or less diagrammatic view illustrating a patient in position for taking a wide-angle roentgenogram.

When it is desired to make a wide-angle X-ray, a pair of cassettes 100 are inserted for right-angular disposition relative to each other in the wide tracks 82 and 84 respectively on the base 12 and if desired a pair of shields 102 are inserted in similar right-angular relationship into the parallel tracks 94 and 96 as indicated by the arrows 108 in FIGURE 3. In order to securely retain the pair of cassettes and the pair of shields in mutual 90° orientation, the clamps or brackets 52 are rotated to the position thereof shown in FIGURE 1 and are properly vertically adjusted relative to the underlying tracks 82 and 84 and 94 and 96 so that the cassettes and shields may be slid into the vertically aligned tracks. It will be noted that the tracks in the two clamps 52 in the position thereof shown in FIGURE 1 for receiving the cassettes and shields by edgewise insertion of the latter are disposed so that the tracks in the clamp 52 at the left hand of the figure are oriented at a 90° angular displacement from the tracks in the clamp 52 at the right hand of the figure in the same manner in which the lower tracks at the V-shaped opening 14 are oriented with the tracks in each of the clamps being in vertical registry with the associated tracks in the base. Consequently the cassettes and shields may be disposed and retained in 90° mutual orientation by merely inserting them edgewise into the upper and lower tracks and it will be understood that for the taking of the conventional X-ray photograph, as previously described, a single cassette and a single shield is also inserted in edgewise direction either from the left hand side or the right hand side of the base 12, viewing FIGURE 3, as indicated by the arrow 104. FIGURE 9 illustrates a pair of cassettes which are mounted in 90° angular relationship to each other for taking a wide-angle X-ray. It will be noted that the patient Q is centered at the apex of the angle formed by the two cassettes with his shoulders extending between the free ends of the cassettes for the taking of a wide-angle X-ray photograph. Such a wide-angle X-ray photograph is illustrated in FIGURE 11.

It will be understood that only a single exposure is required to expose both of the angularly related cassettes 100 for a wide-angle X-ray photograph. The method of taking a wide-angle X-ray photograph takes advantage of a panoramic horizontal elongation and vertical magnification of roentgen images produced by X-rays falling at angles less than 90° on the pair of cassettes 100 mounted at 90° relationship to each other.

Figure 11:
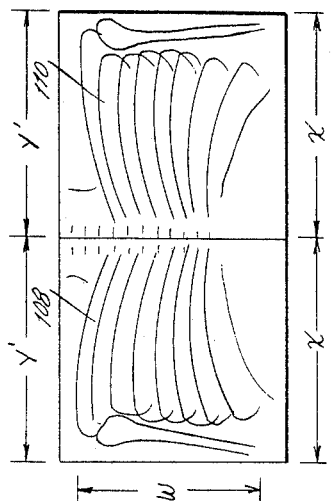
FIGURE 11 illustrates a wide-angled X-ray photograph of the same portion of the patient's body illustrated in the X-ray photograph of FIGURE 10.

A wide-angle X-ray such as illustrated in FIGURE 11 has revealed abnormalities not appreciated on routine frontal and oblique projections (abnormalities sometimes not seen even on retrospect). The utilization of wide-angle X-ray photographs has been especially successful in detection and characterization of rib cage pathology. In addition, overlying parathoracic and a axillary soft parts abnormalities have been diagnosed, and pulmonary parechymal, pleural, mediastinal and cardiovascular diseases demonstrated. In the wide-angle X-ray, the shoulders, hips and skull are accessible and the wide-angle view has also enhanced contrast studies including bronchography, barium, enema and urography. By a comparison of the conventional X-ray photographs shown in FIGURE 10 and the wide-angle X-ray photographs shown in FIGURE 11, it will be apparent that FIGURE 11 provides a pair of oblique projections in which the images 108 and 110 are separated and are considerably magnified when compared with the conventional image 112 in FIGURE 10. The dimensions w, x, y and y' appearing in FIGURES 10 and 11 are conventional designations well known to those skilled in the art and have been included only for the purpose of providing a basis for comparison between FIGURES 10 and 11.

Figure 8:
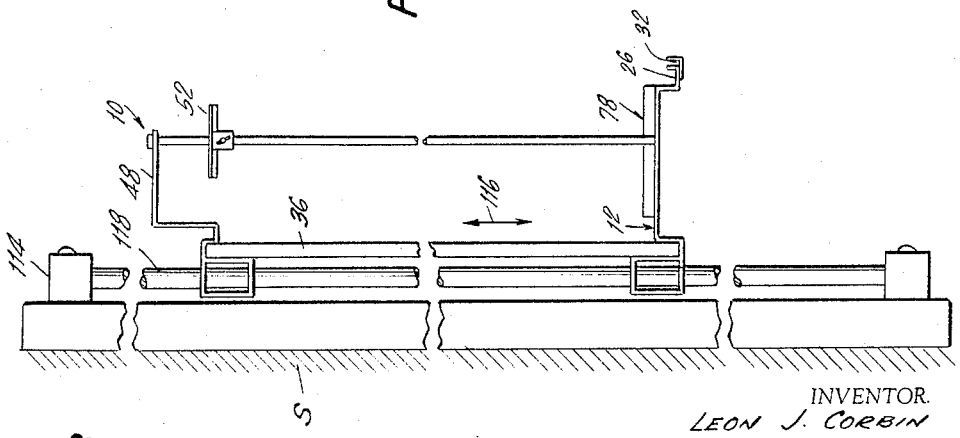
FIGURE 8 is a side elevation showing the holder of FIGURE 1 in position on a stand.

It is also within the scope of the present invention to mount the device 10 on a conventional cassette holder 114 as shown in FIGURE 8. As here shown, the cassette holder 114 may be mounted on a wall or supporting surface S and provided with the base 12 and the rods 50 extending between the base and the associated straps 48 for mounting the clamps 52. In all other respects the construction of the holder 10 is the same as previously described and in the present embodiment the holder is vertically adjustable as shown by the arrows 116 on the posts 118 of the conventional cassette holder mounted on a suitable wall or surface W.

From the foregoing, it will be apparent that there has been illustrated and described a highly novel method and apparatus for providing wide-angle radiography with a single exposure by means of a pair of X-ray cassettes oriented at 90° to each other. The method and apparatus of the present invention result in a saving of time, a decrease in radiation exposure, facilitates the examination of disabled patients and "opens up" anatomic sites foreshortening and superimposition on conventional roentgenograms.

While I have described the presently preferred embodiments of the invention, it will be understood that various changes and modifications may be made therein without however departing from the spirit and scope of the present invention as defined in the appended claims.

I claim:

1. A radiography film cassette fixture comprising an elongated base provided with a pair of track means disposed in substantially right angular relation, a pair of laterally spaced track means extending parallel to the longitudinal axis of said base, and a pair of bracket means each provided with a track means, and means mounting said bracket means for vertical adjustment relative to said base and for angular adjustment relative to said base for selectively positioning each bracket track means in overlying alignment with one of said angularly related track means and with one of said laterally spaced track means whereby to selectively position a film cassette between each bracket track means and the associated one of said angularly related track means or to position film cassette between said pair of laterally spaced track means and both of said bracket track means.

2. A radiography film fixture comprising a base support having a pair of angularly related track means and a pair of bracket means each having a track means dispossible in overlying alignment with one of said first mentioned track means whereby an X-ray film cassette is insertable in each pair of aligned track means, said angularly related track means substantially defining a right angle, a pair of laterally spaced track means extending in alignment across the open side of said angle, each of said bracket means being vertically adjustable relative to one of said angularly related track means and rotationably adjustable relative to one of said laterally spaced track means to dispose the bracket track means in overlying alignment with the associated laterally spaced track means.

3. A radiography film cassette fixture comprising an elongated base provided with a pair of track means disposed in substantially right angular relation, a pair of laterally spaced track means extending parallel to the longitudinal axis of said base, and a pair of bracket means each provided with a track means, and means mounting said bracket means for vertical adjustment relative to said base and for angular adjustment relative to said base for selectively positioning each bracket track means in overlying alignment with one of said angularly related track means and with one of said laterally spaced track means whereby to selectively position a film cassette between each bracket track means and the associated one of said angularly related track means or to position film cassette between said pair of laterally spaced track means and both of said bracket track means.

References Cited by the Examiner

UNITED STATES PATENTS

| 2,111,903 | 3/1938 | Rona | 250—50 |
| 2,340,923 | 2/1944 | Boucher | 250—65 |
| 2,389,495 | 11/1945 | Forssell | 250—66 |
| 2,712,608 | 7/1955 | Atwell | 250—50 X |
| 2,770,719 | 11/1956 | Simjian | 250—59 |
| 2,847,580 | 8/1958 | Arvanetakis | 250—66 |
| 2,922,047 | 1/1960 | Tour | 250—68 |

RALPH G. NILSON, *Primary Examiner.*

A. L. BIRCH, *Assistant Examiner.*